Dec. 16, 1958 J. B. GRAY 2,864,611

RECORDING AND REPRODUCING ASSEMBLY

Filed Oct. 14, 1957 3 Sheets-Sheet 1

INVENTOR.
JOHN B. GRAY,
BY
David Horn
ATTORNEY.

RECORDING AND REPRODUCING ASSEMBLY

Filed Oct. 14, 1957 3 Sheets-Sheet 2

INVENTOR.
JOHN B. GRAY,
BY David Horn
ATTORNEY.

RECORDING AND REPRODUCING ASSEMBLY

Filed Oct. 14, 1957 3 Sheets-Sheet 3

INVENTOR.
JOHN B. GRAY,
BY
David Horn
ATTORNEY.

United States Patent Office 2,864,611

Patented Dec. 16, 1958

2,864,611

RECORDING AND REPRODUCING ASSEMBLY

John B. Gray, Los Angeles, Calif., assignor to Packard Bell Electronics Corp., Los Angeles, Calif., a corporation of California Application October 14, 1957, Serial No. 689,867

8 Claims. (Cl. 271—2.18)

This invention relates to recording and reproducing assemblies, and particularly to magnetic tape assemblies which use endless-type magazines for the storage and handling of magnetic tape.

In many applications there exists a need for an improved form of recording or reproducing assembly. Present-day devices which record or reproduce intelligence are often bulky in size, complicated in structure, or difficult to set up or operate. Furthermore, these present-day devices are often so constructed that they are extremely sensitive in operation and likely to break down under adverse environmental conditions.

A specific example of the need for such an improved recording assembly may be found in certain airborne applications. It is often desired, for example, to enable the operator of an aircraft to record or reproduce information pertaining to a flight. The equipment employed for the storage of the information must be rugged and reliable, while at the same time being as light in weight and occupying as little space as possible. Particularly, the operator should be enabled to operate the assembly quickly and simply both in loading and unloading the storage medium.

The devices employed heretofore for these purposes have fallen short of these desired characteristics in one or more respects. Magnetic tape devices have been used for airborne recording, for example, but these have been cumbersome and heavy or have been of such design that entering and removing the magnetic tape has been a difficult and time-consuming process. Other devices have been made available which have relatively easy loading of the recording medium, such as office recording machines, but these do not provide sufficient information storage capacity, robustness, or fidelity of recording and reproduction.

It is therefore an object of this invention to provide an improved information recording or reproducing assembly which is characterized by ease of handling of the storage medium.

It is another object of this invention to provide an improved recording assembly which is extremely simple to operate and rugged in structure but at the same time accurately preserves the character of the recorded information.

A further object of this invention is to provide an improved inflight recording or reproducing device which is compact and light weight and in which the recording medium may quickly and simply be changed.

A recording assembly in accordance with this invention may be employed as an information recorder for use in in-flight recording of verbal messages. In one particularly advantageous embodiment, there is employed an endless-type magnetic tape magazine together with the desired signal transducers and a driving capstan. When the magazine is fully inserted in a frame containing the transducers and the capstan, a portion of the magnetic tape is placed in operative engagement with the transducers and the driving capstan. A pinching roller is shifted into engagement with the capstan, thus pressing the tape against the capstan, by a pair of spring-coupled crank members which are actuated by the fully-inserted magazine. The crank members are arranged to have two equilibrium positions in which the pinching roller is maintained either in or out of engagement with the capstan. Thus, once the pinching roller is engaged, the magnetic tape is continually driven until a release is effected. An auxiliary spring member is also provided to assist in holding the magnetic tape in engagement with the capstan. When it is desired to change the record medium, the actuation of a manually-controlled member causes the crank members to return to their original equilibrium position, shifting the pinching roller out of engagement with the capstan and ejecting the magazine. A new magazine then need only be fully inserted in a slot to begin the recording operation again.

The novel features of this invention, as well as the invention itself, both as to its organization and method of operation, will best be understood from the following description, when read in connection with the accompanying drawings, in which like reference numerals refer to like parts, and in which.

Figure 1:
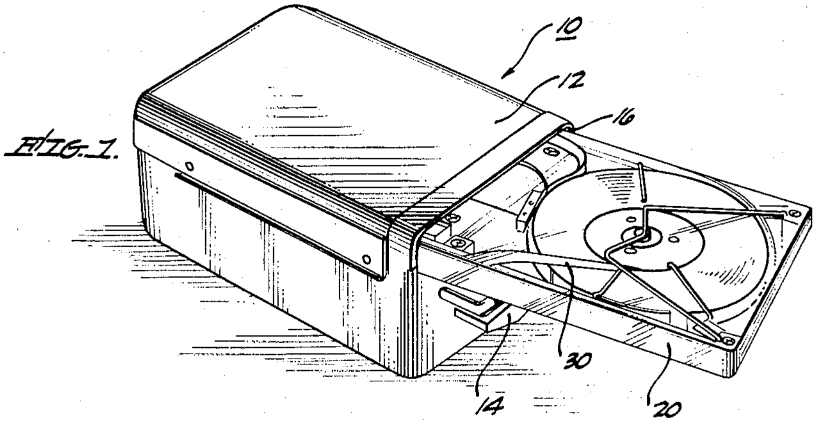
Fig. 1 is a perspective view of a device in accordance with the invention, showing a magazine partially inserted in a recording assembly.
Figures 2, 5:
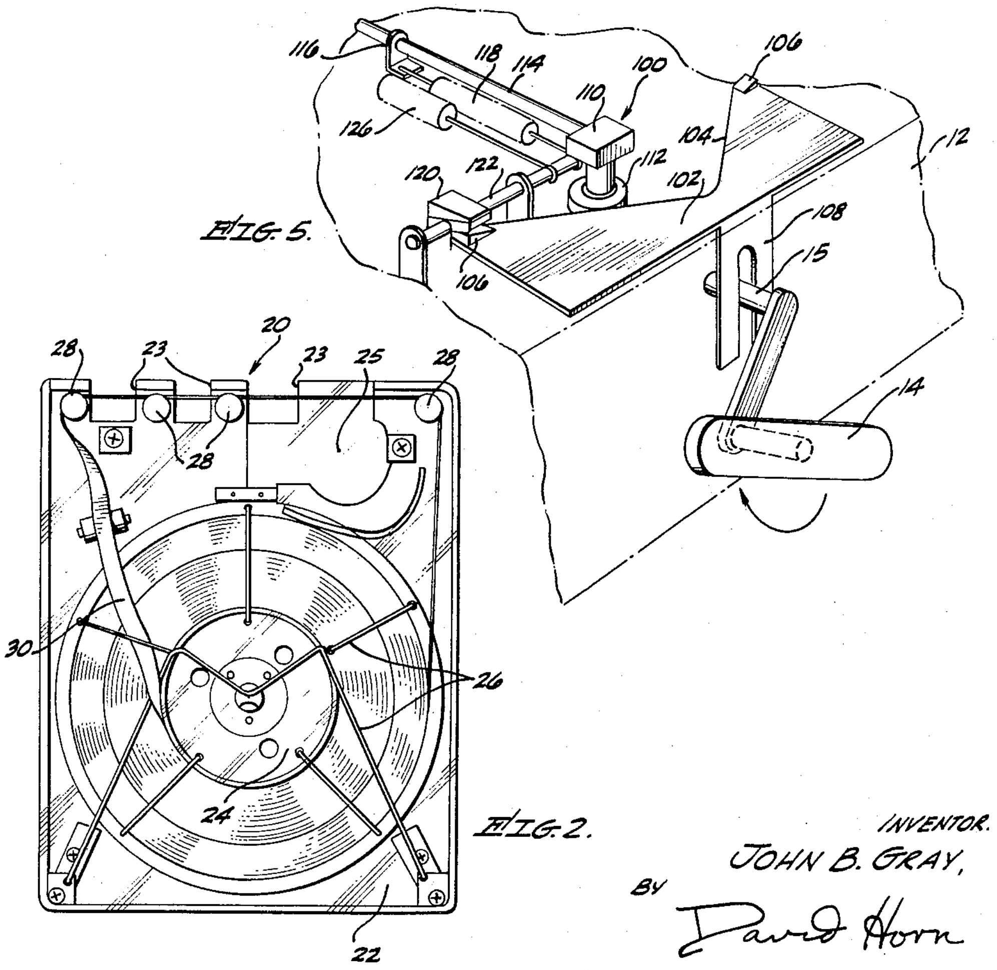
Fig. 2 is a plan view of an endless-type magnetic tape magazine, suitable for employment in accordance with the invention.
Figure 4:
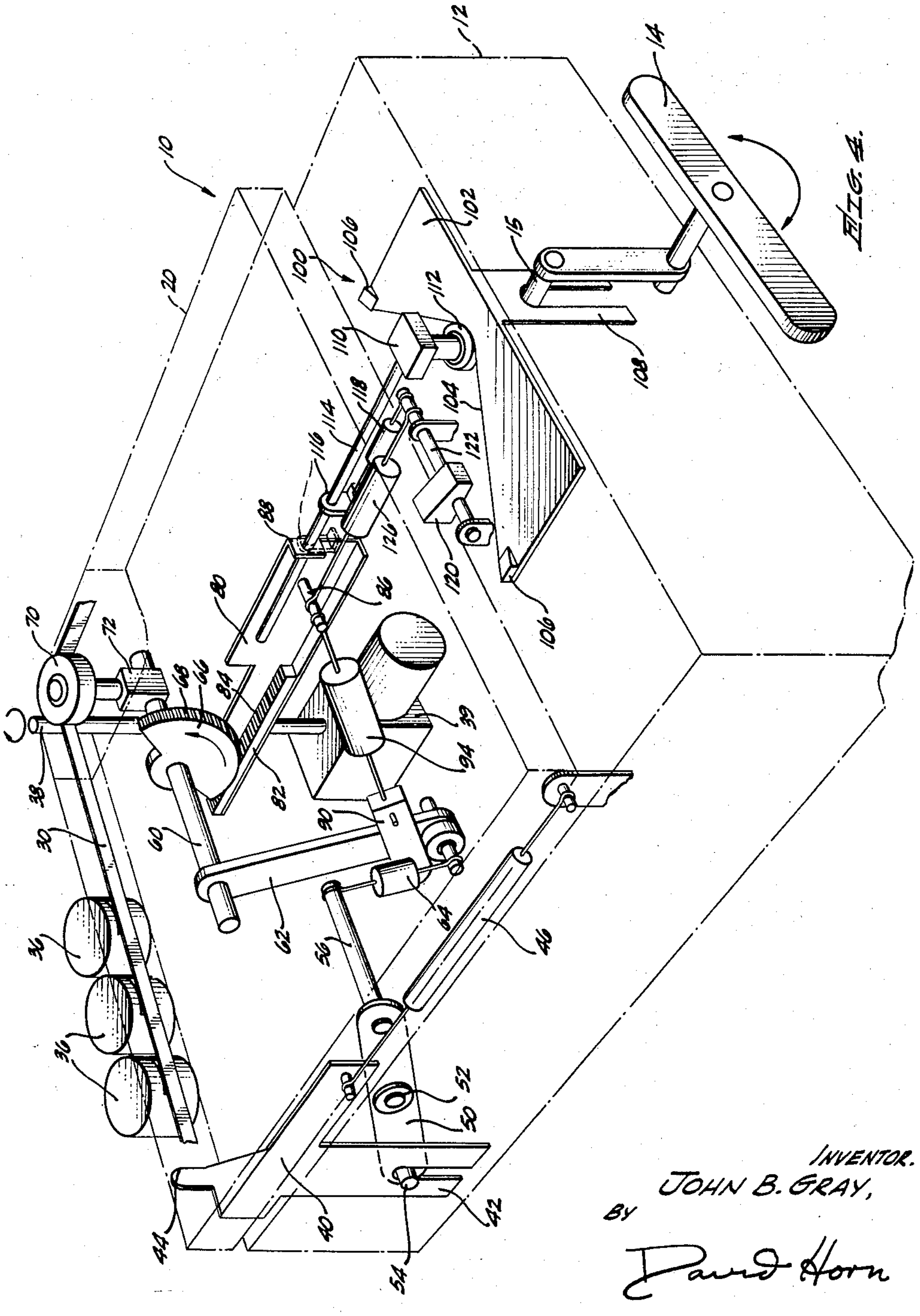

Fig. 4 is a simplified perspective view, partially broken away, of the inner mechanism within the recording assembly of Fig. 1, showing the inner mechanism in the position held when a magazine is fully inserted; and Fig. 5 is af ragmentary perspective view of a portion of the inner mechanism shown in Figs. 4 and 5, illustrating the position of a portion of the inner mechanism when the mechanism is operated to eject a magazine.

The mechanism illustrated and described to exemplify the invention is an extremely compact recording and reproducing assembly for use with an endless-type magnetic tape magazine. As will be evident to those skilled in the art, however, the advantages of the device will obtain in the same fashion whether there is only a recording function, or only a reproducing function, or a combination of these with or without an erasing function.

The general arrangement of the invention, referring now to Fig. 1, may employ a recording assembly 10 which includes a compact cabinet or frame 12 and an operator's handle 14, the function of which is more fully described below. The cabinet 12 also includes an entry slot 16 for receiving a magnetic tape magazine 20.

The magnetic tape magazine 20 is seen more clearly in Fig. 2, to which reference is also made. Endless-type magazines of this nature are currently employed in the art. Detailed descriptions of how they operate may be found, for example, in Patent No. 2,778,636, issued January 22, 1957, to G. H. Eash. Inasmuch as reference may be made to this and similar descriptions, only a general description of the structure and operation will be provided here.

The magazine 20, which may also be referred to as a cartridge, has a body portion 22 in which is mounted a rotatable hub 24. Tape guide wires 26 are arranged between the body 22 and the rotatable hub 24 so as to draw a magnetic tape from a point adjacent the rotatable hub 24 (at the inside of the reel) and to return the tape at a point spaced apart from the hub 24 (at the outside of the reel). Tape guide hubs 28 are spaced about the body so as to guide the tape in a desired path before the tape is returned to the reel. In this desired path the tape is given a half twist in each revolution. Once a spirally reeled endless magnetic tape 30 is mounted on the rotatable hub 24, under the tape guide wires 26 and threaded around the tape guide hubs 28, the magnetic tape 30 thereafter is continuously fed out and returned automatically. For convenience, the magnetic tape 30 will hereinafter be designated as being fed from an inner feed point and returned to an outer return point. For convenience also, the magnetic tape 30 passing along the tape guide hubs may be considered to have a substantially linear operating edge path. This operating edge path is to be placed in engagement with a driving member and also with appropriate transducer devices. A portion of the magnetic tape magazine 20 in line with this operating edge of the magnetic tape 30 may include indentations 23 for receiving appropriate transducer mechanisms, to be described below, and an aperture 25 through which some means such as is described below can be operated to press the operating edge of the magnetic tape 30 against a driving member (not shown in Fig. 2).

As may be seen in Fig. 1, a magnetic tape magazine 20 is inserted in the entry slot 16 of the cabinet 12. When the magazine 20 is fully inserted, the device operates to record in a manner which is described in more detail below. The operator's handle 14 is turned to effect ejection of the magazine 20 from the cabinet 12 so that a new magazine may be inserted.

Figure 3:
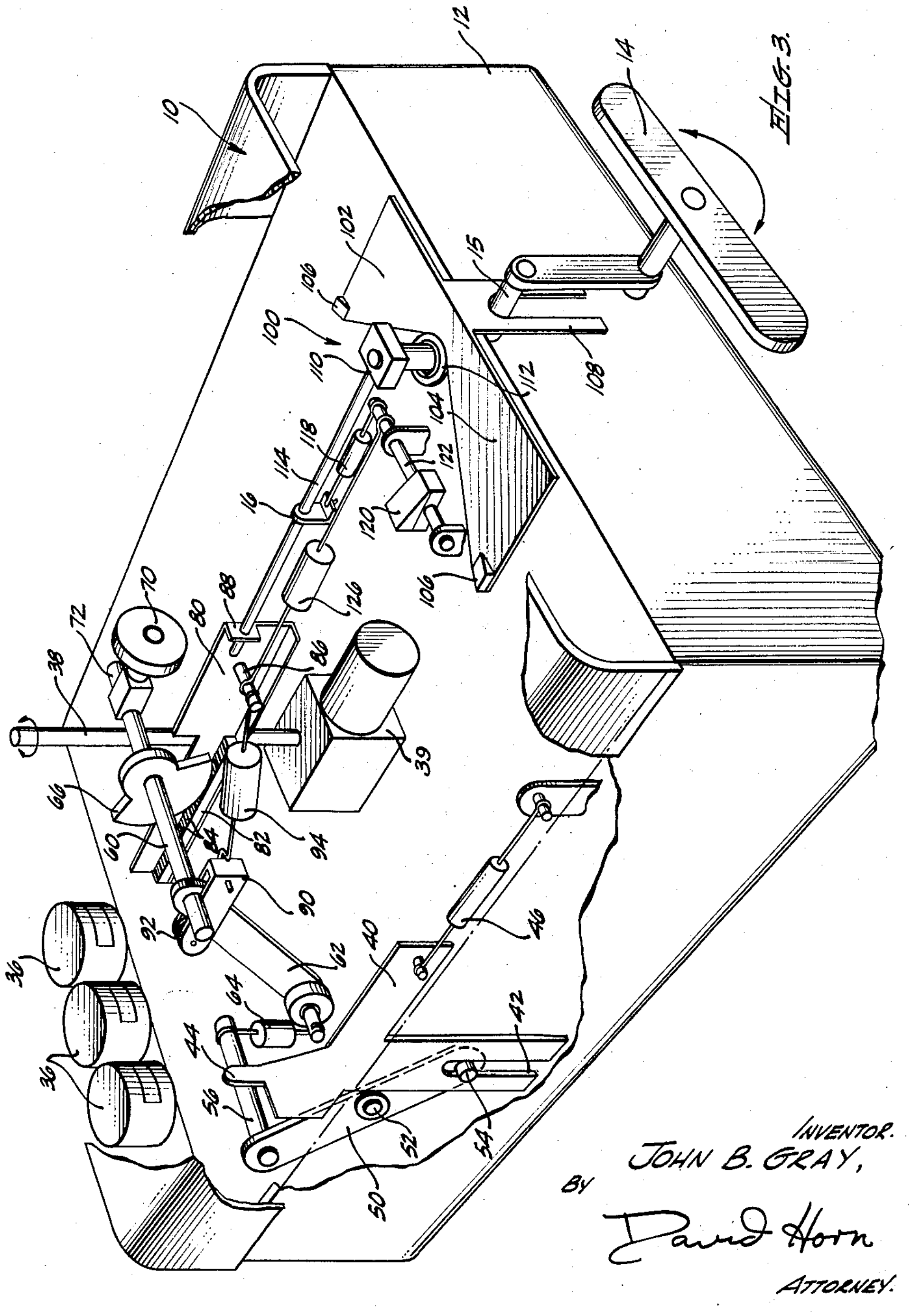
Fig. 3 is a simplified perspective view, partially broken away, of the inner mechanism within the recording assembly of Fig. 1, showing the inner mechanism in the position held prior to the insertion of a magazine.

Figs. 3, 4 and 5, to which reference is now made show the inner mechanism mounted within the cabinet 12 of Fig. 1. For simplicity, and for clarity in understanding the invention, the inner mechanism of the cabinet has been expanded in size and the details of the cabinet have not been shown. In Fig. 3, for example, the entry slot into which the magnetic tape magazine (not shown) is inserted may be considered to define an upper chamber above the lower chamber shown by dotted lines. Within the lower chamber is the inner mechanism of the present recording assembly 10. In line with the operating edge path of a magnetic tape magazine (not shown) when fully inserted are transducer heads 36 and a driving capstan 38. The transducer heads 36 may include a recording head, an erase head and a reproducing head, if it is desired to perform all recording and reproducing functions. These transducer heads 36 and the driving capstan 38 are in operative relation to the operating edge of the magnetic tape when a magnetic tape magazine (not shown) is inserted above the lower chamber of the recording assembly 10. Referring now to Figs. 2 and 3 together, it may be seen that when the operating edge of the magnetic tape 30 is inserted against the transducer heads 36 and the driving capstan 38, the transducer heads register with the indentations 23 of the body 22, and the driving capstan 38 registers with the aperture 25 in the body 22. The driving capstan 38 is turned by a motor 39 (Fig. 3) in the cabinet 12.

The recording assembly 10 will be said to have an entry or front end on the same side as the operator's handle 14. The opposite end, in which the transducer heads 36 and driving capstan 38 are mounted, may therefore be referred to as the rear end of the recording assembly 10. Similarly the recording assembly may be said to have a top portion, within which the entry slot (not shown) is included and a bottom portion indicated by dotted lines which includes the inner mechanism.

Referring specifically now to Fig. 3, the inner mechanism of the recording assembly 10 is shown in a stable position which it occupies when no magazine is inserted or when a magazine is only partially inserted. This stable position is referred to herein as the first equilibrium position and is maintained by means which are more fully described below. The inner mechanism includes a first actuator member 40 slidably mounted within the cabinet 12 within a guide or other member (not shown). The first actuator member 40 is arranged to move slidably in the direction of movement of an entered magazine, that is, either away from or toward the entry end of the recording assembly 10. The first actuator member 40 includes a pronged portion defining a slot 42. A dog 44 which as shown may be integral with the first actuator member 40 extends to the path of movement of a magazine entered in the recording assembly 10. A first actuator spring 46 coupled to the first actuator member 40 and also to a relatively fixed point of the cabinet 12 biases the first actuator member 40 toward the entry end of the recording assembly 10.

A first crank member 50 is rotatably mounted about a center pin 52 which is coupled to the cabinet 12. A follower pin 54 at one extremity of the first crank member 50 rides in the slot 44 of the first actuator member 40, such that the first actuator member 40 of the first crank member 50 move together. A bar 56 is mounted at the other extremity of the first crank member 50, extending normal thereto along an axis parallel to the axis of rotation of the first crank member 50.

A central shaft 60 is rotatably mounted by bearings or other means (not shown) in the cabinet 12. The central shaft 60 is along an axis substantially parallel to the axis of the first crank member 50. A second crank member 62 is fixed to the central shaft 60 at a point adjacent the bar 56 on the first crank member 50. The second crank member 62 extends normal to the central shaft 60, and its free end describes an arc which intersects the arc defined by the bar 56 on the first crank member 50.

A second, biasing, spring 64 couples the free end of the second crank member 62 to the bar 56 on the first crank member 50, tending to bring the members 62, 50 together. The biasing action of the second spring 64 and the relationship of the bar 56 and the free end of the second crank member 62 establishes the first and second equilibrium positions previously referred to. There is a central position in which the second spring 64 is in equilibrium with the two crank members 50, 62 and in which the second spring 64 does not tend to rotate either crank member 50 or 62. This central equilibrium position is roughly that position taken when the longitudinal axes of the first and second crank members 50, 62 are parallel. Exact parallelism of the crank members 50, 62 is not the criterion because of other forces, such as spring forces, acting within the system and because of the positioning of the points about which the crank members 50, 62 rotate. On either side of this central equilibrium position, however, the second spring 64 acts to bring the first and second crank members 50, 62 together, rotating the cranks 50, 62 in opposite directions. Thus the crank members 50, 62 act to move the mechanism into either a first equilibrium position, illustrated in Fig. 3 or a second equilibrium position, illustrated in Fig. 4. For purposes of convenience, the direction of rotation of the central shaft 60 will be referred to from a reference point locking along the axis of the shaft 60 from the first crank member 50. That is, the shaft 60 rotates counterclockwise from the first equilibrium position to the second equilibrium position.

Also mounted on the central shaft 60 is a gear segment 66 having gear teeth 68 (best shown in Fig. 4). The gear teeth 68 are disposed in a plane normal to the axis of the central shaft 60.

A pinching roller 70 is mounted to rotate freely on a hub 72 affixed to the central shaft 60. The pinching roller 70 rotates about an axis normal to the central shaft 60 and swings with the shaft 60 in a plane which intersects the driving capstan 38. Thus the pinching roller 70, as seen in Fig. 4 particularly, presses against the driving capstan 38 in operative engagement when the mechanism is in the second equilibrium position. The operating edge path of the magnetic tape 30 is thus pressed against the capstan 38, so that the tape 30 is driven.

A sliding carriage 80 which may be mounted in the cabinet 12 in guides or ways (not shown) is positioned adjacent the gear segment 66 to move parallel to the direction of entry and removal of a magazine. The sliding carriage 80 includes a rack 82 having teeth 84 in operative engagement with the teeth 68 of the gear segment 66. Thus the gear segment 66 and the sliding carriage 80 move together. The sliding carriage also includes a first pin 86 and a return tab 88 which has a central aperture within which a guide rod (to be described below) may be inserted.

The second crank member 62 is coupled to the first pin 86 of the sliding carriage by a clevis 90 having a roller 92 mounted between the open ends of the clevis 90 and a third, biasing spring 94 coupled to the closed end of the clevis 90 and to the fixed pin 86. The roller 92 on the clevis 90 enables the clevis 90 to move up and down the length of the second crank member 62. As may be seen in Fig. 3, in the first equilibrium position the clevis 90 is near the center of rotation of the second crank member 62, while in the second equilibrium position the clevis 90 abuts against the outer end of the second crank member 62. Thus the arrangement of the clevis 90, the third spring 94 and the sliding carriage 80 acts to provide an auxiliary locking force tending to maintain the mechanism in the second equilibrium position and causing the pinching roller 70 to exert extra force on the driving capstan 38.

The ejection mechanism 100 couples the operator's handle 14 to the sliding carriage 80. The cam plate 102 is mounted in a plane parallel to the plane of an entered magazine. The cam plate 102 includes a first cam surface 104 in the principal plane of the cam plate 102 and second cam surfaces 106 mounted at the extremities of the cam plate 102. The cam plate 102 is mounted in the cabinet 12 by ways or guides (not shown) to move slidably parallel to the plane of an entered magazine and normal to the direction of entry and ejection of the magazine. A tongue 108 extending from the cam plate 102 includes a slot within which moves a crank bar 15 coupled to the rotatable operator's handle 14. Rotation of the operator's handle 14, through the crank bar 15 and the tongue 108, therefore causes the cam plate 102 to move toward either side of the cabinet 12.

A cam follower 110 including a roller 112 is positioned in operative engagement with the first cam surface 104 on the cam plate 102. A guide rod 114 is coupled to the cam follower 110 and extends through the aperture in the return tab 88 of the sliding carriage 80. A bracket 116 is fixed to an intermediate point of the guide rod 14, so as to engage the return tab 88 of the sliding carriage at certain points in the movement of the cam follower 110. A fourth spring 118 coupled to the bracket 116 and a relatively fixed point in the cabinet 12 biases the cam follower 110 toward the entry end of the cabinet 12 and into engagement with the first cam surface 104 on the cam plate.

A locking member 120 is pivotably mounted in the cabinet on a shaft 122 which is hereafter referred to as the locking shaft 122. The locking member 120 is inclined downward toward the entry end of the cabinet 12, so that an entered magazine may pass over the locking member and be restrained from returning toward the entry end of the cabinet 12. The locking member 120 may, if desired, be biased so as to permit a magazine to be entered, but to abut against a surface of the magazine unless positively pivoted out of the way. The second cam surfaces 106 on the cam plate 102 are aligned so as to engage the locking member 120 and accomplish this pivoting action at preselected points in the travel of the cam plate 102. As shown, two second cam surfaces 106 have been illustrated. Only one of these will engage the locking member 120 which is shown. A second locking member (not shown) may, if desired, also be mounted on the locking shaft 122 so as to operate both locking members 120 no matter which direction the operator's handle 14 is turned.

A fifth spring 126 couples the fixed pin 86 of the sliding carriage 80 to the locking shaft 122, thus biasing the sliding carriage 80 toward the entry end of the cabinet 12. The fifth spring 126 assists in maintaining the second equilibrium position.

The operation of the device may best be understood by reference to Figs. 3, 4 and 5 in succession. In Fig. 3 the system is shown and the condition of operation maintained when a magazine has not been inserted or when the magazine is only partially inserted (as in Fig. 1). In this condition of operation, referring specifically now to Fig. 3, the first actuator member 40 is at the limit of its movement toward the entry end of the magazine 20, and the first crank member 50 and the central shaft 60 are in the first equilibrium position. Thus the pinching roller 70 is moved away from the driving capstan 38 and out of the plane of movement of a magazine which is to be entered. The ejection mechanism 100 is in an inoperative position, with the cam follower roller 112 centering the cam plate 102.

On the entry of a magazine 20, referring now to Fig. 4, a magnetic tape 30 is automatically driven and the magazine itself is locked in the operating position. The following sequence of actions may best be understood by visualizing the difference in the position of the elements between Figs. 3 and 4. An entered magnetic tape magazine 20 passes over a locking member 120. The leading edge of the magazine 20 first engages the dog 44 on the first actuator member 40, moving the first actuator member 40 toward the rear or capstan end of the recording assembly 10. The first actuator member 40 rotates the first crank member 50 in the clockwise direction, taking the direction of rotation as has been selected above. Through the bar 56 on the first crank member 50 and the second spring 64 the second crank member 62 is caused to rotate in the counterclockwise direction, thus rotating the central shaft 60 similarly. The inner mechanism therefore shifts past the central equilibrium state into the second equilibrium position. The central shaft 60 is moved counterclockwise to its limit of movement, so that the pinching roller 70 is rotated against the driving capstan 38 in the cabinet 12. As thus arranged, the mechanism moves the pinching roller 70 into position only after the magazine 20 has been fully inserted, so that the magnetic tape 30 is fully in engagement with the transducer heads 36 and the driving capstan 38.

When the magazine 20 is fully inserted, therefore, the mechanism moves into the second equilibrium position illustrated in Fig. 4. The second crank member 62 has moved to its counterclockwise limit of movement, and the sliding carriage 80 has moved toward the entry end of the cabinet 12 because of the operation of the gear segment 66 and the rack 82. In this position, the clevis 90 has moved toward the free end of the second crank member 62, so that the second spring 64 tends to draw the sliding carriage 80 and the free end of the second crank member 62 together. By means of the second spring 64 considerable leverage is exerted on the second crank member 62, further pressing the pinching roller against the driving capstan 38. This auxiliary driving force insures that sufficient and constant pressure is exerted on the magnetic tape 30 to drive it by the driving capstan 38.

When the magazine 20 is fully inserted, the locking member 120 abuts against a surface (not shown) of the magazine 20 to restrain the magazine 20 from moving back toward the entry end of the cabinet 12. The locking member 120 may of course be positioned at a selected point to take advantage of an appropriate surface of the magazine 20 for this purpose.

As has been described, on entry of a magazine 20 the mechanism operates automatically to press the magnetic tape 30 against the driving capstan 38 and to continuously feed the tape from and return the tape to the magazine 20. Because of the operation of the endless-type magazine 20, previously briefly described, no threading or other feeding operation is needed. The tape 30 automatically moves past the transducer heads 36, and recording and reproducing mechanisms (not shown) may be utilized with the transducer heads 36 to record, erase and reproduce as desired. The arrangement of the endless-type magazine 20 is advantageous in another respect. As may be seen in Fig. 2, to which reference is now made, the magnetic tape 30 is provided with a half twist between leaving the reel and return to the reel. Thus on one complete pass of the magnetic tape 30 one side of the tape is played or recorded upon, and on the next pass the other side of the tape 30 is played or recorded upon. One magazine is therefore sufficient for a considerable duration of recording or reproducing before another magazine need be employed.

The operation of the ejection mechanism 100 in effecting a release and ejection of the magazine 20 is best understood by reference to Fig. 5. At the completion of a reel of tape the operator desires to remove the magazine and to perhaps insert a new magazine the completion of the magazine being used may be indicated by a lapse of time or by sensing or footage mechanisms as described further below the operator need only rotate the handle 14 to accomplish release and ejection of the inserted magazine. Rotation of the handle 14 causes the cam plate 102 to slide correspondingly within the cabinet 12 through the crank bar 15 and tongue 108 mechanism. The cam follower 110, moving with the cam follower roller 112, therefore follows the first cam surface 104 and moves away from the entry end of the cabinet 12. The bracket 116 on the associated guide rod 114 moves against the return tab 88 in sliding carriage 80. This position of the ejection mechanism is best seen in Fig. 4, and is represented by dotted lines. A movement of the bracket 116 against the return tab 88 causes the sliding carriage 80 to move toward the rear end of the cabinet 12, beginning a sequence of movements in which the inner mechanism returns to the first equilibrium position.

As the sliding carriage 80 moves toward the rear end of the cabinet 12 the gear segment 66, the central shaft 60 and the second crank member 62 rotate clockwise, toward the first equilibrium position. As soon as the second crank member 62, the first crank member 50 and the second spring 64 have passed the central stable position, the forces in the system bias the mechanism toward the first equilibrium position. Therefore at such time the first crank member 50 seeks to rotate counterclockwise and, along with the first spring 46, seeks to return the first actuator member 40 toward the entry end of the cabinet 12.

The system returns to the first equilibrium position, and the dog 44 on the first actuator member 40 forces the magazine from the cabinet 12 after the magazine has been released from the locking member 120. The locking member 120 is pivoted out of engagement with the proximate surface of the magazine. As soon as the cam follower 110 (referring again to Fig. 5), and the cam follower roller 112 have moved to a selected point on the first cam surface 104, the second cam surface 106 engages the locking member 120. The locking member 120 is pivoted out of engagement with the associated surface of the magazine, thus freeing the magazine for release from the cabinet 12. Accordingly the first actuator member 40 returns from the position shown in Fig. 4 to the position shown in Fig. 3. The dog 44 on the first actuator member 40 accordingly moves the magazine toward the entry end of the cabinet 12, from whence it may be removed by an operator. Prior to this ejection from the cabinet 12, the pinching roller 70 has been rotated out of engagement with the driving capstan 38, from the position shown in Fig. 4 to the position shown in Fig. 3. The necessity for clearing the pinching roller 70 from the ejection path of the magnetic tape 30 is the reason for employing the second cam surface 106 at a preselected point on the cam plate 102. The second cam surface 106 does not release the locking member 102 until the pinching roller 70 is fully out of the path of the magnetic tape 30.

It will be understood that various stop and limit mechanisms may be employed to control the extent of travel of the various elements employed. For example, the operator's handle 14 might be limited to rotation from the start position only in one direction and only through a selected amount of movement.

A number of modifications and adaptations which are not shown will suggest themselves to those skilled in the art. Devices may be used, for example, to sense when a desired segment of the magnetic tape has been utilized. Thus, a conductive marker may be affixed at a selected point on the tape, to complete a circuit with appropriate sensing brushes when the tape has been fully played on one side or on both sides. The same result might also be achieved by perforating selected points in the tape and sensing the passage of the perforations with appropriate photoelectric sensing mechanisms. In either case the signals derived could be used to operate the ejection mechanism at a desired point in the operating cycle. In the exemplification shown the operator's handle could be replaced by a signal-controlled solenoid which would set the ejection mechanism 100 into motion. Circuitry might also be employed which, together with the tape position sensing arrangement and solenoid control, would permit predetermined cycles of operation. It will also be apparent that whether manual or automatic ejection is desired a footage indicator driven along with the magnetic tape can be employed to provide a visual display of the amount of recording medium used or remaining.

Although for simplicity only one exemplification of the invention has been shown, it will be apparent to those skilled in the art that many uses, with or without modification, are within the scope of the invention. The recording assembly provided can be used, for example, as a dictation machine for business purposes. As such it is compact, very easily manipulated, and inexpensive. Because of the fidelity of signal reproduction afforded by magnetic tape systems this assembly can be used as a sound system. In this environment it not only provides superior reproduction but also a continuous playback of long duration. Wherever used, a device according to the invention is portable, extremely rugged and reliable.

Thus there has been described an improved assembly for recording or reproducing information. The system is characterized by ease of handling the record medium, compactness, and economy of construction.

What is claimed is:

1. For a magnetic tape assembly in which a pinching member is pressed toward engagement with a driving capstan to drive the tape when a tape storage device is provided, a tape device engaging arrangement comprising: first and second rotatable crank members; a first spring member coupling said crank members so that each is responsive to the position of the other, said first spring member biasing said crank members into either one of first and second equilibrium positions; means responsive to the presence of a tape device and coupled to said first crank member for moving said crank members into the second equilibrium position when a tape device is inserted; means coupled to said second crank member for pressing the pinching member toward the driving capstan when said second crank member is in the second equilibrium position; slidable means coupled and responsive to said second crank member; and a second spring member coupling said second crank member to said slidable means to provide an auxiliary force tending to maintain the second equilibrium position.

2. For a magnetic tape assembly in which a pinching member is pressed toward engagement with a driving capstan to drive the tape when a tape storage device is provided, an automatic lock and selective eject arrangement comprising: first and second rotatable crank members mounted in parallel planes of rotation; biasing means coupling said crank members so that each crank member is responsive to the position of the other, said biasing means moving said crank members in opposite directions of rotation into either one of first and second equilibrium positions on opposite sides of a first actuator means, including a tape device engaging element, coupled to said first crank member and responsive by said engaging element to the presence of a tape device for moving said first and second crank members from a first equilibrium position into the second equilibrium position; means responsive to the position of the second crank member for pressing the pinching member toward the driving capstan when said second crank member is in the second equilibrium position; locking means having a fixed relationship to the driving capstan and engaging the tape device to maintain the tape device in operative relation to the driving capstan; and second, selectively operable, actuator means coupled to said second crank member and to said locking means for disengaging said locking means from the tape device and concurrently returning said second crank member to the first equiilbrium position, whereby the pinching member is disengaged from the driving capstan and the tape device is ejected by the engaging element of the first actuator means as the first crank element and the first actuator means return to the first equilibrium position by said biasing means.

3. For a magnetic tape assembly in which a pinching member is pressed toward engagement with a driving capstan to drive the tape when a tape storage device is provided, an automatic lock and selective eject arrangement comprising: first and second rotatable crank members mounted in parallel planes of rotation; a first spring member coupling said crank members so that each crank member is responsive to the position of the other, said first spring member moving said crank members in opposite directions of rotation into either one of first and second equilibrium positions, each of said positions having each of said crank members on an opposite side of a parallel relationship; a first slidably movable actuator member including a tape device engaging tab, said first actuator member being responsive by said tab to the presence of a tape device and coupled to said first crank member to move therewith, said first actuator member moving said first and second crank members from the first equilibrium position, when no tape device is present, to the second equilibrium position, when a tape device is placed in operative proximity to the driving capstan; a pivotable locking device having a fixed spatial relation to the driving capstan and engaging a surface of the tape device to hold the tape device in operative proximity to the driving capstan; means coupled to and rotatable with said second crank member for pressing the pinching member toward the driving capstan when said second crank member is in the second equilibrium position, thereby to drive the magnetic tape by the driving capstan; a slidable carriage operatively coupled to said second crank member; a clevis member mounted on and movable longitudinally along said second crank member; a second spring member coupling said carriage to said second crank member to provide an auxiliary bias force to maintain the second equilibrium position, thereby to increase the pressure of the pinching member against the driving capstan; second, selectively operable, actuator means having a first cam surface in operative relation to said pivotable locking device and a second cam surface in a plane substantially parallel to the axis of said slidable carriage, the first cam surface being disposed so as to pivot the locking device out of engagement with the tape device, and the second cam surface being so arranged as to provide a linear increment of movement sufficient to displace the slidable carriage from the second equilibrium position to the first equilibrium position; and a cam follower coupled to said slidable carriage and in operative engagement with said second cam surface, whereby when said second actuator member is operated the tape device is freed of the pivotal locking device, and the first equilibrium position is assumed so that the pinching member is disengaged from the driving capstan and the tape device is ejected by the tab of the first actuator member.

4. An assembly for the utilization of a reel of magnetic tape comprising: a housing having a slot into which a reel is to be inserted; transducer means and driving means mounted in said housing, each in operative relation with a segment of magnetic tape of a fully-inserted reel; spring-biased means coupled to said housing and having first and second stable positions of movement; pinching means coupled to said spring-biased means and positioned to contact the segment of magnetic tape adjacent said driving means when said spring-biased means assumes said second stable position, thereby to drive said tape by said driving means; first actuator means coupled to said spring-biased means and responsive to the position of an inserted reel to place said spring-biased means in said second stable position when the reel is fully inserted; and second selectively operable means coupled to said spring-biased means for returning said spring-biased means to said first stable position.

5. An assembly for the utilization of magnetic tape reeled on an endless-type magazine and comprising: a housing structure including an upper slot for receiving the magazine and a lower chamber for operating elements, at least one transducer and a drive capstan mounted in said housing structure, each in operative relation with a segment of magnetic tape of a fully-inserted magazine; swingable means mounted within the lower chamber of said housing and having an element movable into operative relation with said capstan for maintaining the segment of magnetic tape against said capstan, thereby to drive the magazine of magnetic tape; means principally within the lower chamber of said housing and having two relatively stable positions of movement, said means being responsive to the position of an inserted magazine and coupled to said swingable means for selectively moving the element thereof into (1) operative relation with said capstan or (2) into said lower chamber; and selectively operable means at least partially within the lower chamber of said frame and coupled to said means having two positions of movement for operating said means to move the element of said swingable means into said lower chamber.

6. An improved recording system characterized by ease of handling of the recording medium and comprising: a rectangular frame having an entry slot in a plane along one side thereof for an endless magnetic tape-type magazine; at least one magnetic transducer mounted in said frame in the plane of said slot and on the opposite side of the frame therefrom; a rotatable capstan mounted in said frame normal to the plane of said slot and positioned with the transducer to engage an outer tape surface of a magnetic tape magazine inserted fully in the slot; a depressible dog rotatably mounted in said frame adjacent said entry end and extending into the plane of said slot temporarily to lock in the fully inserted position an entered magazine; a first plate element slidably mounted in said frame and movable in the directions toward and away from said slot and including a tab extending into the path of an entered magazine; spring biasing means coupling said first plate element to said frame and tending to draw said element toward said entry slot; a rotatable shaft within said frame adjacent and substantially parallel to the plane of said slot, said shaft being substantially normal to the directions of entry and removal of a magazine; an auxiliary arm normal to and coupled to said rotatable shaft; a free-turning roller mounted on said arm to rotate about the longitudinal axis thereof, said auxiliary arm and said roller being positioned along said shaft such that when said shaft is rotated said roller abuts against said rotatable capstan to pinch a magnetic tape of an inserted magnetic tape magazine between said roller and capstan, thereby to drive said tape; a first crank member rotatably mounted in said frame and coupled to said first plate element to be responsive to the position thereof, said first crank member rotating in a plane normal to the longitudinal axis of said rotatable shaft; a second crank member mounted on and extending normally from said rotatable shaft; means including a first spring member coupling an end of said first crank member to the free end of said second crank member, said first spring member acting to hold said crank members in either one of two stable relationships when said crank members are other than parallel; a carriage member, slidably mounted in said frame to move along an axis substantially parallel to the plane of said slot, said carriage including a toothed rack extending along its axis of movement; gear means coupled to said rotatable shaft, said gear means including at least a gear segment in operative relation with said toothed rack such that said carriage and rotatable shaft move together; a clevis member mounted on said second crank member and movable therealong; a second spring member coupling said clevis member and said carriage so as to tend to rotate the rotatable shaft to which the second crank member is coupled to bring said free-turning roller against said rotatable capstan; a third spring member coupling said carriage to a relatively fixed point of said frame and biasing said carriage toward said entry slot; a second, manually operable, plate element slidably mounted in said frame in a plane parallel to the plane of said entry slot and movable transversely thereto, said second plate element including a cam surface defined by the edge closest to said carriage member and at least one supplementary cam member positioned so as to engage said depressible dog to rotate said dog so as to release a magazine locked in the fully inserted position thereby; a cam follower device in engagement with the cam surface on said second plate element, said cam follower device including a surface abutting against said carriage and acting to move said carriage in a direction away from said entry slot as said cam follower device is moved similarly by said cam surface, and biasing means coupled to said carriage and cam follower device and tending to force said cam follower device toward said entry slot, thereby to tend to maintain said second plate element in a stable initial position.

7. In an assembly for utilizing a magnetic tape stored in an endless reel-type magazine which is inserted in the assembly, an arrangement for holding the tape in operating position against a driving capstan comprising: a first crank member rotatably mounted in the assembly and rotatably responsive to the position of an inserted magazine; a shaft rotatably mounted in said assembly along an axis substantially normal to the plane of rotation of said first crank member; a second crank member mounted on and normal to said shaft; the cylinder of revolution described by a free end of the second crank member, as said member rotates, intersecting the cylinder of revolution described by one free end of said first crank member; first biasing means coupling the free ends of said first and second crank members and tending to hold said crank members in stable positions on either side of a central position in which said first and second crank members and said first biasing means lie in a common plane, said shaft thereby being rotatably responsive to the position of said first member; and roller means coupled to said shaft and rotating therewith to an operative relation to said driving capstan as said first crank member, second crank member and said shaft move in response to the insertion of a magazine, whereby said roller pinches the magnetic tape of said magazine against said capstan so that the magnetic tape is driven.

8. In an assembly for utilizing a magnetic tape stored in an andless reel magazine which is inserted in the assembly from a front position, an arrangement for driving the magnetic tape by a driving capstan comprising: an actuator member mounted in said assembly to slide in the front to rear direction of said assembly, said actuator member including a tab extending into the path of an inserted magazine and being responsive to the position of an inserted magazine; a first crank member rotatably mounted in said assembly and coupled to and responsive to the position of said actuator member, a first free end of said first crank member intersecting a first predetermined plane as said first crank member rotates; a shaft member rotatably mounted in said assembly along an axis parallel to the axis of rotation of said first crank member; a second crank member mounted on said shaft member and having a first free end intersecting said first predetermined plane as said second crank member rotates; a first spring member coupling the first free ends of said first crank member and said second crank member and tending to draw said first free ends together, thus maintaining first and second stable positions about a central position, the second position being that in which a magazine is fully inserted; a carriage slidably mounted in the front to rear direction in said assembly; means coupling said shaft to said carriage to move said carriage as said shaft is rotated; a clevis member slidably mounted to move along said second crank member toward and from said first free end; a second spring member coupling said clevis member to a point on said carriage such as to provide an auxiliary force to maintain said second crank member in said second stable position; and roller means coupled to said shaft and rotating therewith, said roller means in the second stable position of said shaft engaging said driving capstan, thereby to force the magnetic tape of a fully inserted magazine against the capstan so that the magnetic tape is driven.

References Cited in the file of this patent

UNITED STATES PATENTS 2,778,880 Eash ------------------ Jan. 22, 1957